United States Patent [19]
Bennett

[11] 3,713,707
[45] Jan. 30, 1973

[54] BEARING SEAL
[75] Inventor: John D. Bennett, Richardson, Tex.
[73] Assignee: Sun Oil Company (Delaware), Dallas, Tex.
[22] Filed: Jan. 12, 1970
[21] Appl. No.: 2,210

[52] U.S. Cl. ................... 308/8.2, 277/90, 308/187.1
[51] Int. Cl. .............................................. F16c 33/78
[58] Field of Search ...308/8.2, 187.2, 187.1; 277/22, 277/89, 90, 81, 88, 95; 175/371, 337, 372

[56] References Cited

UNITED STATES PATENTS

| | | | |
|---|---|---|---|
| 2,600,434 | 6/1952 | Saywell | 277/95 |
| 2,622,902 | 12/1952 | Malmvik | 277/88 X |
| 3,467,448 | 9/1969 | Galle | 277/81 X |
| 1,420,416 | 6/1922 | Dlesk | 277/81 X |
| 1,561,426 | 11/1925 | Fischbacher | 277/88 X |
| 1,895,288 | 1/1933 | Larsh | 277/81 X |
| 3,332,610 | 7/1967 | Osterstrom | 277/90 X |

*Primary Examiner*—Milton Kaufman
*Assistant Examiner*—Barry Grossman
*Attorney*—George L. Church, Donald R. Johnson, Wilmer E. McCorquodale, Jr. and John E. Holder

[57] ABSTRACT

A bearing seal especially useful in drill bits is arranged so that the heat emanating from the friction created by rotation of one part about another is substantially reduced before reaching the sealing element. This is accomplished by dissipating the heat into the surrounding environment through a thin metallic element located in the heat path preceding the sealing element. Additionally, the heat path is arranged to be circuitous so that the heat has a long pathway in contact with the surrounding environment.

9 Claims, 2 Drawing Figures

PATENTED JAN 30 1973　　　　　　　　　　　3,713,707

INVENTOR
JOHN D. BENNETT

*John E. Holder*

ATTORNEY

BEARING SEAL

BACKGROUND OF THE INVENTION

This invention relates to an improved bearing seal where high temperatures are created by friction or other heat sources which attack the bearing seal. Drill bits currently in use in the oil industry are comprised of a housing having one or more shanks extending downwardly from the housing and terminating in journals about which a cone rotates. Bearings are located between the journal and cone for ease of rotation and usually are laminated or split journal bearings. The drill bit cones have teeth for cutting the formation when the drill pipe attached to the bit is rotated. Mud is circulated through this system to carry the cuttings to the surface and to cool the drill bit. A seal is necessary between the cone and the shank so that the bearings about which the cone rotates is protected from the drilling mud. If the drilling mud is allowed to reach the bearing area, the bearings will fail in a short time, since such mud normally contains various minerals which are abrasive in nature. In current practice drill bits are improved to the point where the drill bits will last as long as the seal lasts. Thus the bearing seal becomes the design limitation of the bit and any innovations to extend the useful life thereof will in turn extend the life of the drill bit. High temperatures are created in the cone and journal as the cone rotates on the journal, due to the load on the bearings created by the weight on the bit for cutting the formation. Also the friction of the teeth against the formation being cut creates heat in the cone. This heat is transmitted via the cone to the bearing seal. Even though high temperature resistant seals are employed, such as TEFLON or VITON, they cannot withstand the heat transmitted by the cone and shank plus that of the mud temperature, until the bit teeth are no longer useful for cutting purposes. The sealing member now employed is a circular seal between the cone and the shank which provides a seal by being in contact with both the cone and the shank. Therefore, the cone rotates on the seal and is in direct contact with it as far as heat transfer is concerned.

The tendency in the oil industry is to drill deeper and deeper wells. This is because the shallow reservoirs, which are easier to find and drill, have become less numerous. With deeper wells come higher bottom hole temperatures and accordingly, higher mud temperatures.

The heat resistant materials being employed in current drill bits break down around 450° F. Since drilling mud temperatures are normally in the range of 250° F. to 300° F., it requires only an additional 150° F. to 200° F. build-up in temperature of the cone or journal to reach the break-down temperature of TEFLON and VITON. Since mud temperatures frequently exceed 300° F. it is evident that only slight build-ups in temperature from internal sources within the cone or journal will operate to destroy the seal.

It is therefore an object of the present invention to provide a new and improved bearing seal for use in high temperature operations.

SUMMARY OF THE INVENTION

With this and other objects in view, the present invention is an improved sealing means for bearings in a drill bit, where a drill bit cone having cutting members rotates around a shank and the bearings are between the cone and the shank. The sealing means includes a first heat dissipating element interposed between the cone and a sealing member and a second heat dissipating element interposed between the shank and a second sealing member. These heat dissipating elements are metallic, have high heat transfer properties, and are arranged such that there is a large surface area for heat dissipation to the surrounding environment.

DESCRIPTION OF THE PREFERRED EMBODIMENTS

Figure 1:
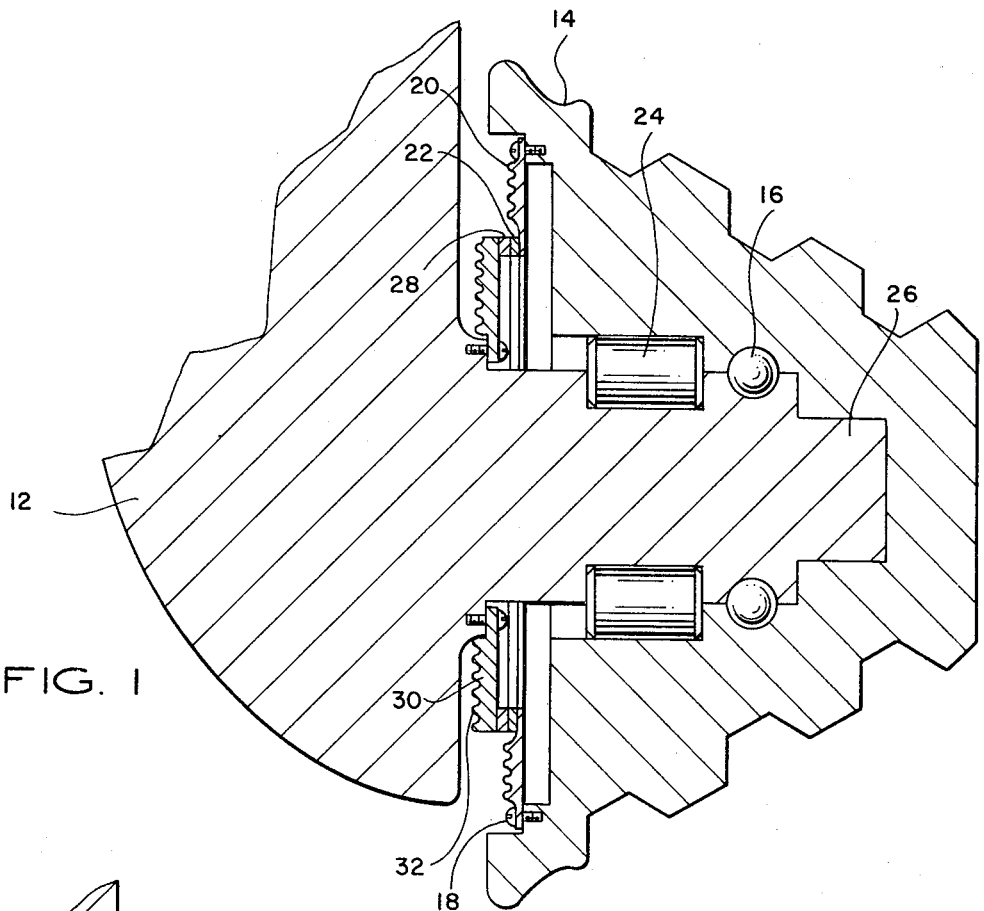
FIG. 1 is a cross-section of a drill bit cone arranged on a drill bit shank having sealing means in accordance with the present invention between the cone and the shank.

FIG. 1 depicts a drill bit shank 12, terminating in a journal 26. Located about the journal 26 is a cone 14 which rotates about roller bearings 24 and ball bearings 16 which are lubricated by oil emanating from a reservoir in the shank. This reservoir is not shown in the drawing, but is a common expedient in the design of drill bits. Attached to the end of the cone nearest the end of the shank is a first metallic heat dissipating element 20 secured to the cone by screws 18. Attached to the end of the first heat dissipating element 20 is a first sealing member 22. Where the shank 12 starts to form the journal 26 there is attached a second metallic heat dissipating element 30, attached by screws 18 to the shank 12. At the other end of the heat dissipating element is a second sealing member 28 which is in slidable contact with the first sealing member 22. The heat dissipating elements 20 and 30 and sealing members 22 and 28 are annularly shaped and concentric. The annularly shaped dissipating elements 20 and 30 overlap a distance equivalent to the width of the annular bands of sealing members 22 and 28. The sealing members 22 and 28 preferably have the same interior and exterior diameters and are interposed between the overlapping portion of dissipating elements 20 and 30.

The heat dissipating elements 20 and 30 are preferably made of a highly heat conductive metallic material such as beryllium copper and is thinly constructed for fast heat dissipation. The sealing members 22 and 28 are bonded to the overlapping ends of the heat dissipating elements 20 and 30 and are arranged to overlap each other in such a manner to ensure a complete seal while the bit is rotating. The sealing members are preferably a heat resistant material such as TEFLON or VITON. Each sealing member should be thick enough to withstand wear from sliding against the adjacent seal for the life of the drill bit.

Anomalies 32 provide additional surface area for contacting the surrounding environment which in this case would be drilling mud. These anomalies 32 are arranged on the side of the heat dissipating elements in contact with environment surrounding the drill bit and are of the same material as the dissipating members.

These anomalies are preferably a multiplicity of hemispherical protrusions and can be cast or shaped in the dissipating members.

In operation of the drill bit illustrated, the cone 14 rotates about the journal 26 on bearings 24 and 16. Heat generated on the outside surface of the cone 14 by frictional contact with the formation being cut, and heat generated by the load on the bearings 24 and 16 is transmitted throughout the journal 26 and cone 14. In order for the heat to reach the first and second sealing members 22 and 28 respectively, it is necessary for the heat to travel a circuitous pathway and eventually through the first and second metallic heat dissipating elements.

The area between the seal and the bearings is filled with a bearing lubricant which will also be heated by the heat in the cone and the shank. A portion of this heat will be transmitted to the seal, however, the lubricant is not as conductive as the metal, and the majority of the heat transferred to the lubricant will be dissipated to the mud through the metallic heat dissipating elements 20 and 30.

Figure 2:
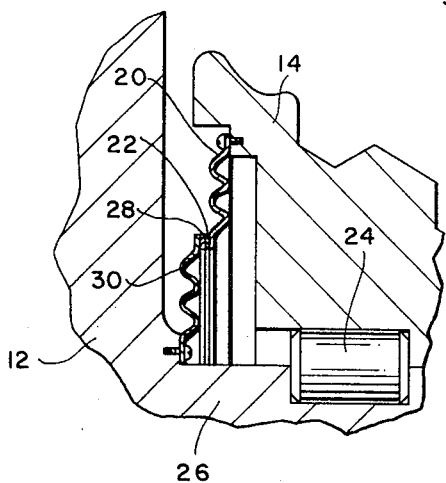
FIG. 2 is a cross-section of the upper portion of a drill bit cone arranged on a drill bit shank and showing an alternative embodiment of the sealing means shown in FIG. 1.

FIG. 2 depicts an alternative embodiment of the heat dissipating elements shown in FIG. 1. Only the upper portion of the drill bit cone and related drill bit shank is shown. Located for rotation about shank 12 on roller bearing 24 is cone 14. Attached close to the outside edge of the cone 14 is a first annular heat dissipating element 20. Attached to the end of the dissipating element 20 is a first annular sealing member 22. Where the shank 12 starts to form the journal 26 there is attached one end of a second annular heat dissipating element 30 having an opposite end which overlaps the end portion of the first heat dissipating element 30. This overlapping end of the second heat dissipating element 30 has a second annular sealing member 28 attached thereto. These dissipating elements 20 and 30, and sealing members 22 and 28 are concentric and are arranged so that the sealing member 22 and 28 are in slidable contact.

As depicted, the heat dissipating elements 20 and 30 are formed in a spring-like manner to provide means for keeping the sealing members 22 and 28 in contact. Thin metallic material such as beryllium copper can be corrugated to provide the flexibility to attain the spring-like effect. The sealing members 22 and 28 can be maintained in contact in other manners such as springs between the cone and shank and the dissipating elements. Also a hydraulic jet directed against the second heat dissipating element 30 would serve to keep the sealing members in contact. The first and second dissipating elements 20 and 30 should also be angled toward one another so they exert a pressure on each other, through the sealing members, thereby providing a pressure contact between the sealing members.

The heat dissipating elements can be attached by screws as shown in FIGS. 1 and 2, by welding or by any other appropriate manner. The corrugated dissipating elements 20 and 30 of FIG. 2 also affords a high surface area for contact with the environment surrounding the drill bit which provides for efficient heat dissipation.

While a particular embodiment of the present invention has been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. In a drill bit for use in drilling earth formations having a cone rotatably attached to a shank where such rotation creates high temperatures, a sealing assembly for preventing the environment surrounding the drill bit from communicating with the point of rotation of the cone on the shank, comprising: a first annular thin corrugated metallic heat dissipating means having one end attached to the shank; a first sealing member attached to the end of the first heat dissipating means which is not attached to the shank; a second annular thin corrugated metallic heat dissipating means having an end attached to the cone; and a second sealing member attached to the end of the heat dissipating means which is not attached to the cone, and is in slidable contact with the first sealing member, wherein the first and second sealing members are spaced from the shank and the cone.

2. The drill bit of claim 1 wherein the first heat dissipating means has only the end attached to the shank in contact with the shank and wherein the first sealing member is spaced from the attached end of the first heat dissipating means.

3. The drill bit of claim 1 wherein the second heat dissipating means has only the end attached to the cone in contact with the cone and wherein the second sealing member is spaced from the attached end of the second heat dissipating means.

4. The drill bit of claim 1 wherein the first heat dissipating means has a substantial portion thereof in contact with the environment surrounding the drill bit and out of contact with the shank, and wherein such substantial portion is located between the attached end of the first heat dissipating means and the first sealing member and wherein the second heat dissipating means has a substantial portion thereof in contact with the environment surrounding the drill bit and out of contact with the cone, and wherein such substantial portion is located between the attached end of the second heat dissipating means and the second sealing member.

5. The apparatus of claim 1 wherein the first and second heat dissipating means are constructed of a high heat conductive thin flexible material having low transverse heat conducting properties relative to its vertical conductivity.

6. The apparatus of claim 1 wherein the cone, shank and first and second heat dissipating members are arranged to provide a circuitous heat pathway to the first and second sealing members for heat generated at the point of rotation.

7. The apparatus of claim 1 wherein the first and second heat dissipating means have a substantial portion of their surfaces in contact with the environment surrounding the drill bit and out of contact with the cone and shank.

8. The apparatus of claim 1 including means for maintaining the first and second sealing members in contact.

9. The apparatus of claim 6 wherein the circuitous heat pathway is arranged such that the heat from friction caused by rotation of the cone on the shank housing travels a constricted path adjacent the environment surrounding the drill bit before reaching the sealing members.

* * * * *